United States Patent [19]

Eppler

[11] 4,317,683
[45] Mar. 2, 1982

[54] ORANGE PIGMENTS OF INVERSE SPINEL STRUCTURE PRODUCED BY CO-CALCINATION OF COMPOUNDS OF IRON AND ZINC WITH COMPOUNDS OF TITANIUM, TIN AND/OR SILICON

[75] Inventor: Richard A. Eppler, Timonium, Md.

[73] Assignee: Mobay Chemical Corporation, Pittsburgh, Pa.

[21] Appl. No.: 239,783

[22] Filed: Mar. 2, 1981

[51] Int. Cl.$^3$ .......................... C09C 1/04; C09C 1/22; C09C 1/28; C09C 1/36
[52] U.S. Cl. .................................. 106/292; 106/299; 106/304
[58] Field of Search ................ 423/598, 593; 106/292, 106/304, 300, 299, 288 B, 73.3; 252/301.6 F, 301.4 F

[56] References Cited

U.S. PATENT DOCUMENTS 3,424,551  1/1969  Owen ..................................... 23/51

FOREIGN PATENT DOCUMENTS 162519  4/1955  Australia ..................... 252/301.6 F
1417251  11/1968  Fed. Rep. of Germany ... 106/288 B

OTHER PUBLICATIONS

The Major Ternary Structural Families by O. Muller & R. Roy, Springer-Verlag, New York, pp. 254 and 255.

*Primary Examiner*—Helen M. McCarthy
*Attorney, Agent, or Firm*—Gene Harsh; Joseph C. Gil

[57] ABSTRACT

The present invention is directed to orange inorganic pigment materials which are characterized by high tinctorial strengths, excellent color and thermal stability and relatively high opacity. These pigments are of inverse spinel structure and are produced by cocalcining compounds of iron and zinc with compounds of titanium, tin and/or silicon.

6 Claims, No Drawings

ORANGE PIGMENTS OF INVERSE SPINEL STRUCTURE PRODUCED BY CO-CALCINATION OF COMPOUNDS OF IRON AND ZINC WITH COMPOUNDS OF TITANIUM, TIN AND/OR SILICON

BACKGROUND OF THE INVENTION

Spinels are solid materials of varying composition in which the unit cell is a closely packed cubic arrangement of 32 anions with 24 cations distributed in interstices between the anions. These materials may be represented by the general formula:

$$X_2Y_nO_{2n+2}.$$

When n equals 1, the material is said to be stoichiometric. Real material, however, may deviate to some extent from the stoichiometric composition. In inverse spinels, the ions X are divalent and the ions Y are tetravalent. In these inverse spinels, one-half of the divalent ions enter the structure in a tetrahedral configuration, while the other half of the divalent ions together with all of the tetravalent ions are present in the structure in octahedral coordination.

The materials which may be considered for use in developing a spinel are those for which the ionic radius is greater than 0.6 angstroms but less than 1.0 angstroms. Thus, ions such as iron, zinc, magnesium, nickel, copper, cobalt, manganese, titanium, tin, silicon, vanadium may be considered.

Blue and green pigments of this system have been known for some time. For example, combinations of nickel oxide, cobalt oxide and zinc oxide together with titanium dioxide have been sold as a light green pigment. In U.S. Pat. No. 3,424,551 are disclosed blue and green pigments made from mixtures of titanium, magnesium, cobalt and zinc oxides. In addition, certain specific compounds such as $Zn_2TiO_4$, $Mg_2TiO_4$ and $Co_2TiO_4$ are discussed in some detail in the scientific literature (for example, see the book, "The Major Ternary Structural Families" by O. Muller and R. Roy, particularly pages 254 and 255).

Quite surprisingly, however, I have discovered that within certain specified composition ranges, it is possible to produce orange pigments within the general framework of the inverse spinel system.

DESCRIPTION OF THE INVENTION

The present invention is thus directed to an inorganic orange pigment of an inverse spinel structure having the general formula $$X_2Y_nO_{2n+2}$$

wherein n is a number of from 0.3 to 2.5 and preferably from 0.9 to 1.1, wherein X is a divalent ion selected from the group consisting of 0.4 to 1.7 mols of iron, 0.3 to 1.6 mols of zinc, 0 to 0.6 mols of magnesium, 0 to 0.2 mols of nickel, 0 to 0.2 mols of copper, 0 to 0.2 mols of cobalt and 0 to 0.2 mols of manganese, the total amount of said divalent ions being 2 mols, and wherein Y is a tetravalent ion selected from the group consisting of titanium, tin, silicon and mixtures thereof. If desired, up to 5% of the total mols of tetravalent ion can be vanadium.

In the most preferred embodiment X is a divalent ion selected from the group consisting of 0.5 to 1.5 mols of iron and 0.5 to 1.5 moles of zinc, and Y is titanium.

When the concentration of iron is less than 0.4 mols, the tinctorial strength is inadequate. When the concentration exceeds 1.7 mols, the color changes to a reddish-brown. Reverse effects are noted for zinc. When the concentration exceeds 1.6 mols, there is inadequate tinctorial strength while less than 0.3 mols of zinc results in a brown or reddish-brown pigment. Up to 0.6 mols of magnesium can be added usually replacing zinc. When the concentration exceeds 0.6 mols, the resultant paint lacks gloss and takes on a decided brownish cast. The total concentration of nickel, copper, cobalt and manganese should be held to less than 0.2 mols in order to prevent a change of color from orange to brown.

Either titanium, tin, silicon or a combination thereof can be used for the tetravalent ion. The clarity of color when silicon is used is inferior to the other two ions. Economic considerations point to the superiority of the titanium.

Considerable deviation from the spinel stoichiometry can be tolerated in this system. Nevertheless, when the value of "n" is less than 0.3, the color shifts to a brown. When the value of "n" exceeds 2.5, the tinctorial strength is greatly reduced through the copresence of substantial amounts of a dititanate phase together with the spinel.

These materials are prepared by weighing out appropriate amounts of conventional ceramic-grade oxides or carbonates and then carefully blending them and passing them through a hammer mill in order to break up agglomerates. The mixtures are then calcined at temperatures between 1600 and 2100° F. (872–1150° C.). Times of one to two hours at peak temperature and total cycles of 18 to 24 hours are preferred.

After calcining, it is generally necessary to mill these pigments until there is no residue upon a 325 mesh screen.

In order that one skilled in the art may better judge these colors, the following procedure has been utilized to disperse them in a paint medium and evaluate their properties:

The paint vehicle is prepared by mixing 174.3 grams of a commercially available short oil, nonair drying alkyd [Resimene 82-60 (Monsanto Chemical Co.)] with 388.6 grams of a commercially available thermosetting acrylic (Cook vehicle D-4125-AM). Then 80 grams of xylene and 27.1 grams of diacetone alcohol are added and the mixture shaken on a paint shaker for ten minutes. To prepare a paint sample, 82.0 grams of this vehicle are mixed with 15.0 grams of the pigment to be tested and 100.0 grams of 20 to 30 mesh sand in an 8-ounce jar. The jar is capped and placed on a paint shaker for 15 minutes. The sand is then filtered out of the paint and the fineness of the grind recorded by measurement on a Hegman gauge. The paint is then drawn down with a 0.006 inch Bird applicator on a Laneta card that is half white and half black. The drawdown is allowed to stand for five minutes and then baked in an oven at 325° C. for two minutes. The color of the finished paint can then be measured over the white substrate and over the black substrate. A Diano Spectrophotometer was used for the color measurements.

To further illustrate this invention, the following Examples are presented:

EXAMPLES

EXAMPLE 1

82.8 grams of anatase, 84.4 grams of fine milled zinc oxide and 95.2 grams of ferric hydroxide were weighed out, blended and passed through a hammer mill. The mixture was then calcined at 1980° F. for one hour. The resulting orange pigment was then milled in water until there was not residue on a 325 mesh screen. The resulting pigment had the formula $FeZnTiO_4$. When placed in a paint as described previously, a Hegman reading of 7 was obtained and an orange color for which the color readings over white background are $R_D=26.8\%$, $a=17.2$ and $b=26.3$. Over a black background, the readings are $R_D=26.3\%$, $a=15.4$ and $b=26.0$.

EXAMPLE 2

88.9 grams of anatase, 43.6 grams of magnesium carbonate, 54.3 grams of fine milled zinc oxide and 102.1 grams of ferric hydroxide were weighed out, blended and passed through a hammer mill. They were then calcined at 1980° F. for one hour. The resulting dark orange pigment was milled in water until there was no residue on a 325 mesh screen. The resulting pigment had the formula $FeZn_{0.6}Mg_{0.4}TiO_4$. When mounted in a paint vehicle as described above, the Hegman reading was $6\frac{1}{2}$ and the color properties over a white background are $R_D=19.3\%$, $a=19.4$ and $b=27.1$. Over a black background, the color properties are $R_D=19.3\%$, $a=18.9$ and $b=27.0$.

EXAMPLES 3-15

The formulations given in Table 1 were weighed out, blended and passed through a hammer mill. They were then fired according to the schedules given in Table 1. After firing, each of the calcined materials was milled in water until there was no residue upon a 325 mesh screen. The formula of the resulting pigment in each case is given in Table 2. The pigments were then individually added to the paint formulation discussed above in order to obtain a Hegman reading and an evaluation of the color properties over both white and black backgrounds. The results are also given in Table 2.

TABLE 1

| EXAMPLE | 3 | 4 | 5 | 6 | 7 | 8 | 9 | 10 | 11 | 12 |
|---|---|---|---|---|---|---|---|---|---|---|
| Anatase Fine Milled | 82.8 | 35.4 | 138.3 | — | 82.5 | 113.1 | 92.0 | 85.8 | 82.9 | 83.2 |
| ZnO | 84.4 | 108.3 | 56.4 | 91.9 | 67.2 | 69.1 | 75.0 | 69.9 | 134.5 | 84.7 |
| FeOOH | 95.2 | 122.1 | 63.6 | 103.7 | 94.7 | 77.9 | 63.4 | 98.5 | 37.9 | 76.5 |
| −325 mesh $SiO_2$ | — | — | — | 67.9 | — | — | — | — | — | — |
| $NiCO_3$ | — | — | — | — | — | — | — | — | — | — |
| $MnCO_3$ | — | — | — | — | 43.7 | — | — | — | — | 24.7 |
| $MgCO_3$ | — | — | — | — | — | — | 67.8 | 21.1 | — | — |
| Fired at | 1750° F. 1 Hr. | 1750° F. 1 Hr. | 1750° F. 1 Hr. | 1980° F. 1 Hr. | 1750° F. 1 Hr. | 1750° F. 1 Hr. | 1980° F. 1 Hr. | 1980° F. 1 Hr. | 1980° F. 1 Hr. | 1750° F. 1 Hr. |

| EXAMPLE | 13 | 14 | 15 |
|---|---|---|---|
| Anatase Fine Milled | 82.9 | 83.1 | — |
| ZnO | 84.4 | 42.3 | 65.2 |
| FeOOH | 76.1 | 143.2 | 73.6 |
| CuO | 16.6 | — | — |
| $SnO_2$ | — | — | 120.8 |
| Fired at | 1750° F. 1 Hr. | 1980° F. 1 Hr. | 1980° F. 1 Hr. |

TABLE 2

| EXAMPLE | 3 | 4 | 5 | 6 | 7 | 8 | 9 |
|---|---|---|---|---|---|---|---|
| Formula | $TiFeZnO_4$ | $Ti_{.33}FeZnO_{2.67}$ | $Ti_{2.5}FeZnO_7$ | $SiFeZnO_4$ | $TiFeZn_{.8}Mn_{.2}O_4$ | $Ti_{1.67}FeZnO_{5.33}$ | $TiFe_{.6}Zn_{.8}Mg_{.6}O_4$ |
| Hegman Reading | 7 | 7 | 7 | 7 | 7 | 7 | 6 |
| White Background | | | | | | | |
| $R_D$ | 26.6 | 21.9 | 33.9 | 20.1 | 26.1 | 30.2 | 28.9 |
| a | 19.3 | 20.8 | 14.7 | 22.8 | 17.6 | 17.0 | 14.8 |
| b | 27.2 | 24.5 | 28.4 | 24.8 | 25.7 | 28.3 | 28.1 |
| Black Background | | | | | | | |
| $R_D$ | 26.5 | 21.8 | 34.0 | 19.8 | 26.0 | 30.3 | 28.6 |
| a | 19.0 | 20.8 | 19.3 | 21.1 | 16.7 | 16.4 | 13.2 |
| b | 27.1 | 24.5 | 28.6 | 24.6 | 25.6 | 28.2 | 27.7 |

| EXAMPLE | 10 | 11 | 12 | 13 | 14 | 15 |
|---|---|---|---|---|---|---|
| Formula | $TiFeZn_{.8}Mg_{.2}O_4$ | $TiFe_{.4}Zn_{1.6}O_4$ | $TiFe_{.8}Ni_{.2}ZnO_4$ | $TiFe_{.8}Cu_{.2}ZnO_4$ | $TiFe_{1.5}Zn_{.5}O_4$ | $SnZnFeO_4$ |
| Hegman Reading | $6\frac{1}{2}$ | 6 | 7 | $6\frac{1}{2}$ | $6\frac{1}{2}$ | 7 |
| White Background | | | | | | |
| $R_D$ | 22.3 | 46.0 | 29.0 | 27.2 | 12.7 | 16.3 |
| a | 18.4 | 10.4 | 13.7 | 16.4 | 20.2 | 24.9 |
| b | 29.7 | 32.0 | 29.7 | 31.0 | 22.5 | 26.4 |
| Black Background | | | | | | |
| $R_D$ | 22.2 | 43.1 | 29.0 | 27.0 | 12.8 | 16.2 |

TABLE 2-continued

| | | | | | | |
|---|---|---|---|---|---|---|
| a | 17.9 | 5.5 | 13.5 | 16.2 | 20.1 | 24.3 |
| b | 29.6 | 30.1 | 29.6 | 31.1 | 22.4 | 26.3 |

What is claimed is:

1. An inorganic orange pigment of an inverse spinel structure having the general formula:

$$X_2Y_nO_{2n+2}$$

wherein n is a number of from 0.3 to 2.5, wherein X is a divalent ion selected from the group consisting of
  0.4 to 1.7 mols of iron,
  0.3 to 1.6 mols of zinc,
  0 to 0.6 mols of magnesium,
  0 to 0.2 mols of nickel,
  0 to 0.2 mols of copper,
  0 to 0.2 mols of cobalt, and
  0 to 0.2 mols of manganese,
the total amount of said divalent ions being 2 mols, and wherein Y is a tetravalent ion selected from the group consisting of titanium, tin, silicon and mixtures thereof.

2. The pigment of claim 1 wherein n is a number of from 0.9 to 1.1.

3. The pigment of claim 1 wherein X is a divalent ion selected from the group consisting of 0.5 to 1.5 mols of iron and 0.5 to 1.5 mols of zinc.

4. The pigment of claim 1 wherein Y is titanium.

5. The pigment of claim 4 wherein X is a divalent ion selected from the group consisting of 0.5 to 1.5 mols of iron and 0.5 to 1.5 mols of zinc.

6. The pigment of claim 5 wherein n is a number of from 0.9 to 1.1.

* * * * *